Oct. 6, 1959 W. A. HORNING ET AL 2,907,706
NEUTRONIC REACTOR FUEL ELEMENT
Filed Oct. 15, 1957 7 Sheets-Sheet 1
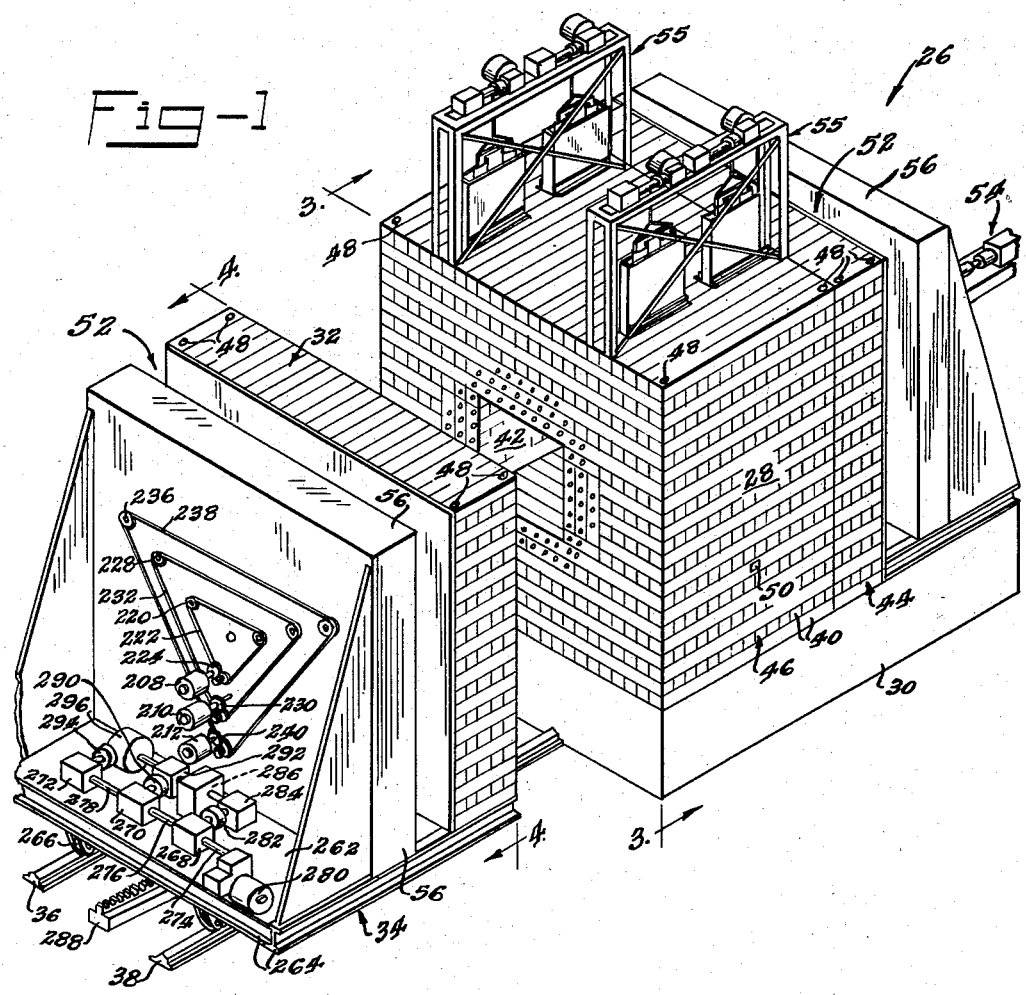
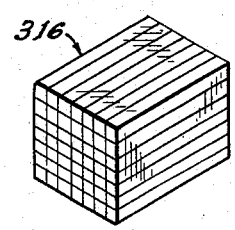
INVENTORS.
Wendell A. Horning
David D. Lanning
Douglas J. Donahue
By
Attorney

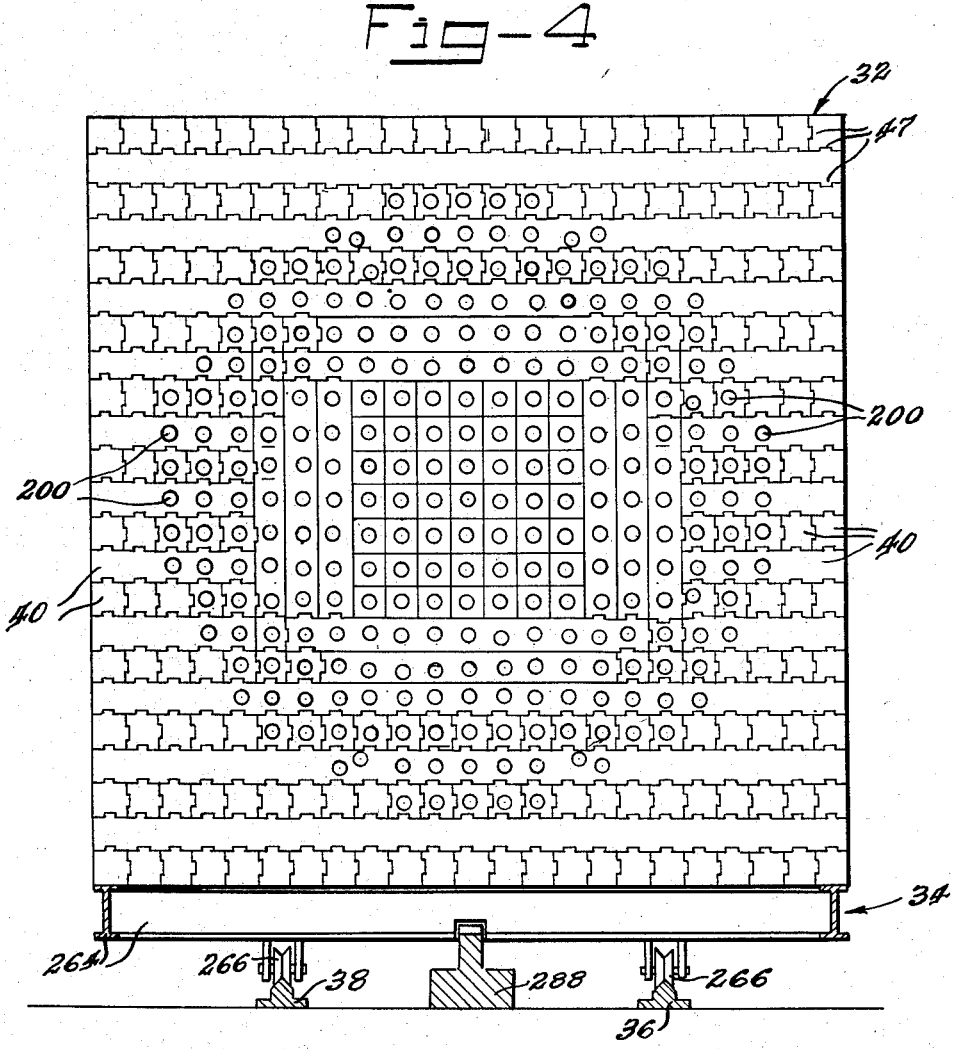

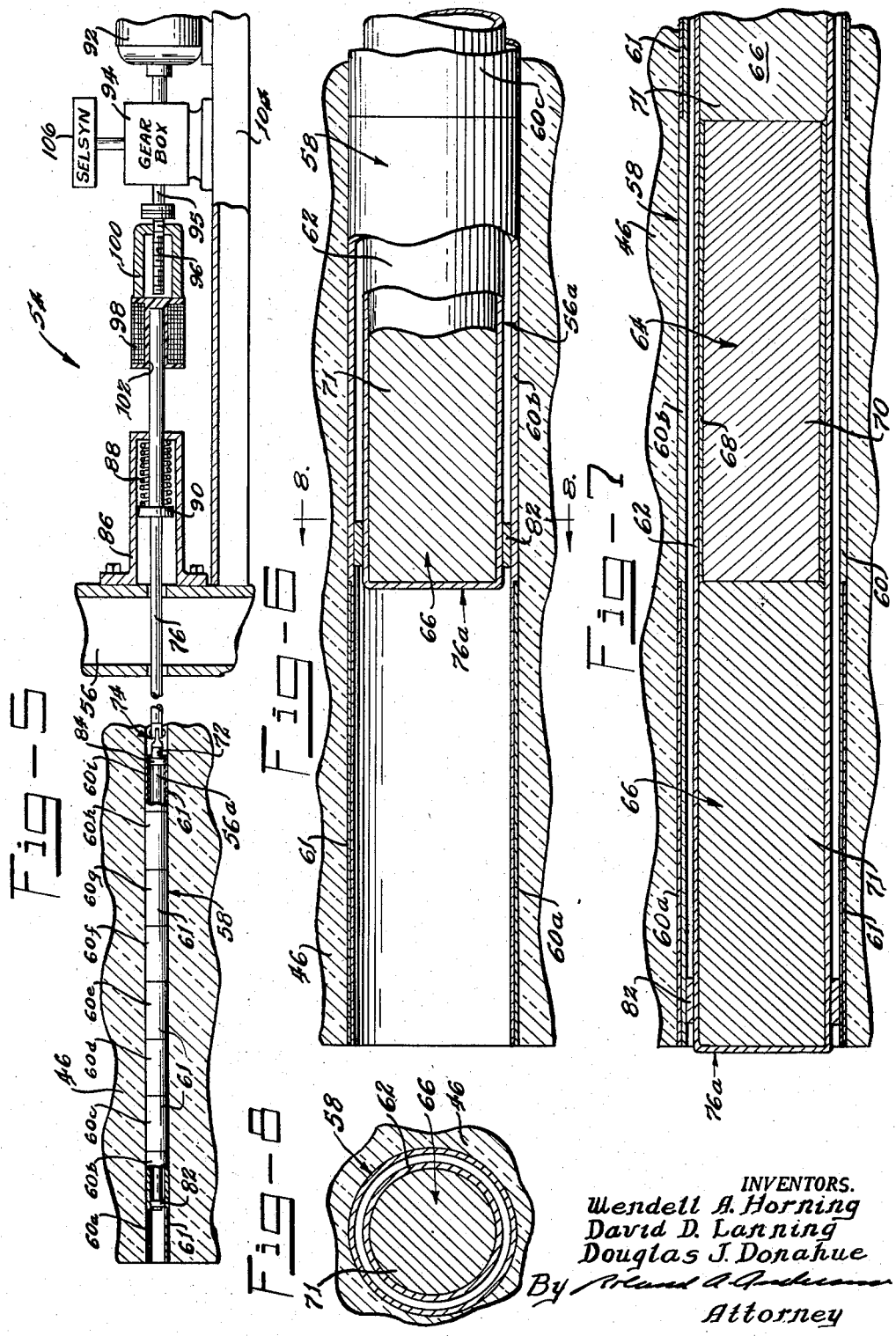

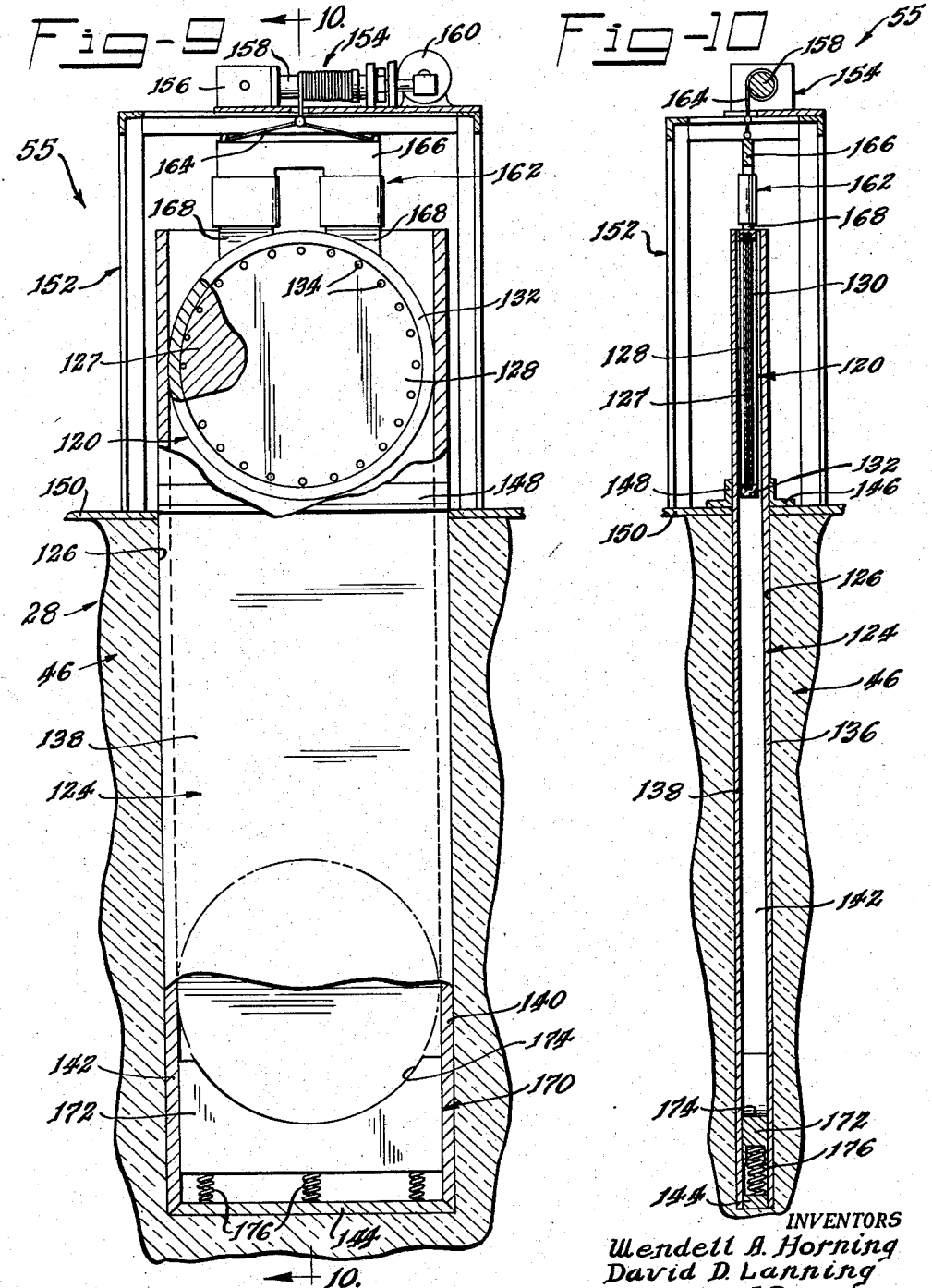

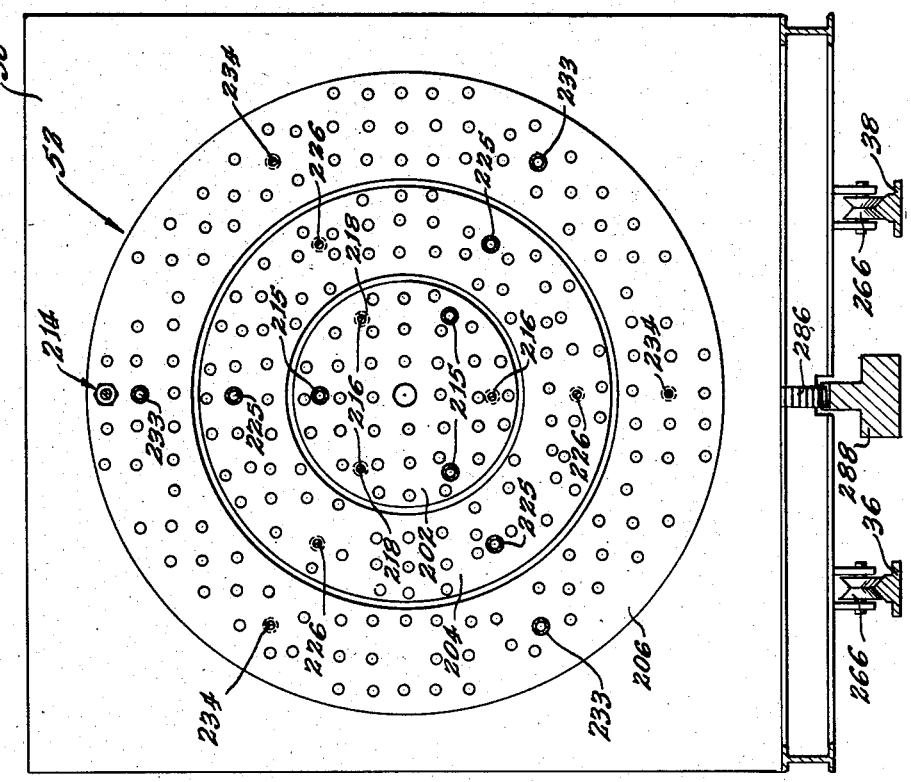
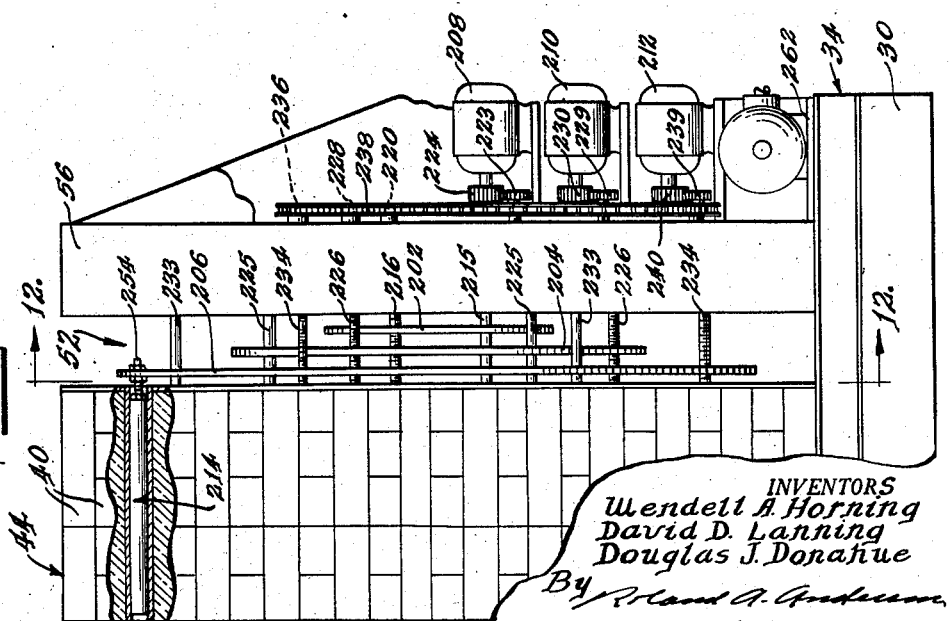

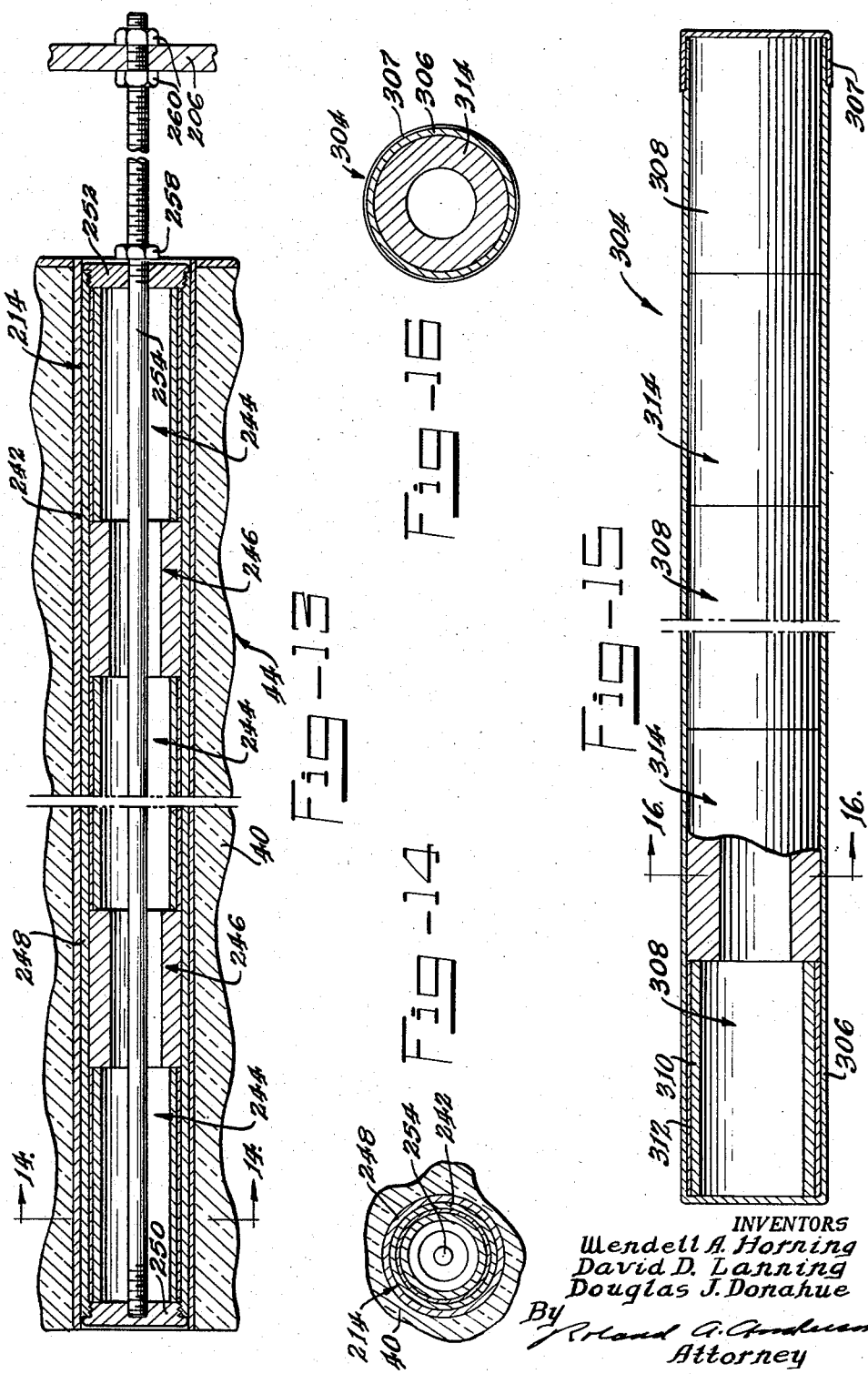

United States Patent Office 2,907,706
Patented Oct. 6, 1959

2,907,706

NEUTRONIC REACTOR FUEL ELEMENT

Wendell A. Horning, Playadel Rey, Calif., David D. Lanning, Watertown, Mass., and Douglas J. Donahue, Richland, Wash., assignors to the United States of America as represented by the United States Atomic Energy Commission Application October 15, 1957, Serial No. 690,410

3 Claims. (Cl. 204—193.2)

This invention relates in general to neutronic reactors and in particular to a safety system employing fissionable fuel in a fail-safe arrangement.

As is generally known, a neutronic reactor is an apparatus for producing useful neutronic flux resulting from fission of suitable nuclear fuel. Many neutronic reactors are regulated during normal operation by translating members or regulating rods within the active portion of reactor structure, said rods possessing varied neutron capture cross-section characteristics. It is usual to equip each reactor with at least one safety system which, in response to abnormal or run-away condition in reactivity, will shut down the reactor. As is well known to those familiar with reactor kinetics, the reactor power or flux rises exponentially with a decrease in control, which rise, if allowed to increase unchecked, would result in ultimate destruction of the reactor and subject those in close proximity to hazards affecting life and health. It is therefore incumbent upon the designers of neutronic reactors to incorporate at least one safety control system utilizing control rods or other means to shut down the reactor during a malfunction. The presence of a second system obviates the possibility of a catastrophe resulting from the failure of a single safety system. The control safety systems in use at the present time are dependent on various components located outside of the reactor, which components function in response to a given signal signifying a run-away condition of the reactor to introduce various means into the interior of the reactor to absorb neutrons released therein. Any one of these systems employed above has a disadvantage in that it is not absolutely dependable and therefore requires another safety system to cooperate with it to give greater dependability. Furthermore, even though two safety systems are employed, there exists the possibility, although highly improbable statistically, that both systems may fail, therefore requiring that additional systems be added. Also, a certain amount of time elapses before the control rods are inserted to become effective in the active portion of the reactor. This time delay is a definite disadvantage in any safety system.

It is therefore desirable to have a safety system which is independent of means external to the reactor and is inherently related to the production of neutron flux within the active portion of the reactor.

It is the object of this invention to provide means for limiting the power excursion in a run-away reactor.

Another object of the invention is to provide a loss of neutrons due to a change in geometric configuration of the active portion of the reactor brought about by an excessive neutron flux excursion.

A further object of the invention is to provide means to limit the excessive power excursion in a reactor by destroying neutron economy.

Another object of the invention is to provide a reactor wherein an excessive power excursion inherently limits itself.

Another object of the invention is to provide a reactor using a configuration of fuel elements which will inherently prevent a dangerously excessive power excursion therein.

A further object of the invention is to provide a composition of fissionable fuel fabricated into a particular shape which will limit reactivity in a neutronic reactor.

Other objects of the present invention will be apparent from the description and the drawings which accompany it.

In accordance with the teachings of this invention, there is provided a neutronic reactor utilizing a particular geometric configuration of fissionable fuel elements having a particular composition of matter and having a novel structure. The fuel elements are made of a thermal-neutron fissionable material, such as $U^{235}$, distributed in a matrix of material having a low-melting characteristic, such as lead. The mixture of lead-$U^{235}$ is fabricated into hollow elements, such as tubes, and inserted into aluminum tubes which extend horizontally through the active portion of the reactor. The fuel elements housed in said aluminum tubes, upon exposure to fission heat brought about by abnormal neutron flux condition in the reactor, will melt and collapse, thus changing the geometric configuration in the active portion. Essentially, mutual shielding of the fuel elements in each aluminum tube is increased whenever they melt and concentrate their molten mass in the lower portion of the tube housing it. This change in the geometric configuration of the fuel elements in the active portion of the reactor is sufficient to effectively shut down the reactor.

The advantages of the apparatus and method of the present invention will be fully understood from the following description including the drawings, wherein:

Fig. 1 is an isometric representation of the embodiment of the invention of a neutronic reactor having a central cavity;

Fig. 2 is an isometric view of a core which is insertable into the cavity within the neutronic reactor;

Fig. 4 is an elevation view of a movable reactor face mounted on tracks, said view being taken along the line 4—4 of Fig. 1;

Fig. 5 is a cross sectional view of a control device extending horizontally through a portion of the reactor proper;

Fig. 6 is a cross sectional view, greatly enlarged, of an end portion of the horizontal control device shown in an "open" position within a portion of the reactor proper;

Fig. 7 is a cross sectional view, greatly enlarged, of an end portion of the horizontal control device shown in "closed" position;

Fig. 8 is a transverse sectional view along the line 8—8 of Fig. 6;

Fig. 9 is a front view of a vertical safety device used within the reactor;

Fig. 10 is a cross sectional view taken along the line 10—10 of Fig. 9;

Fig. 11 is a side view of a portion of the reactor disclosing the mechanism for actuating the horizontal control devices;

Figure 3:
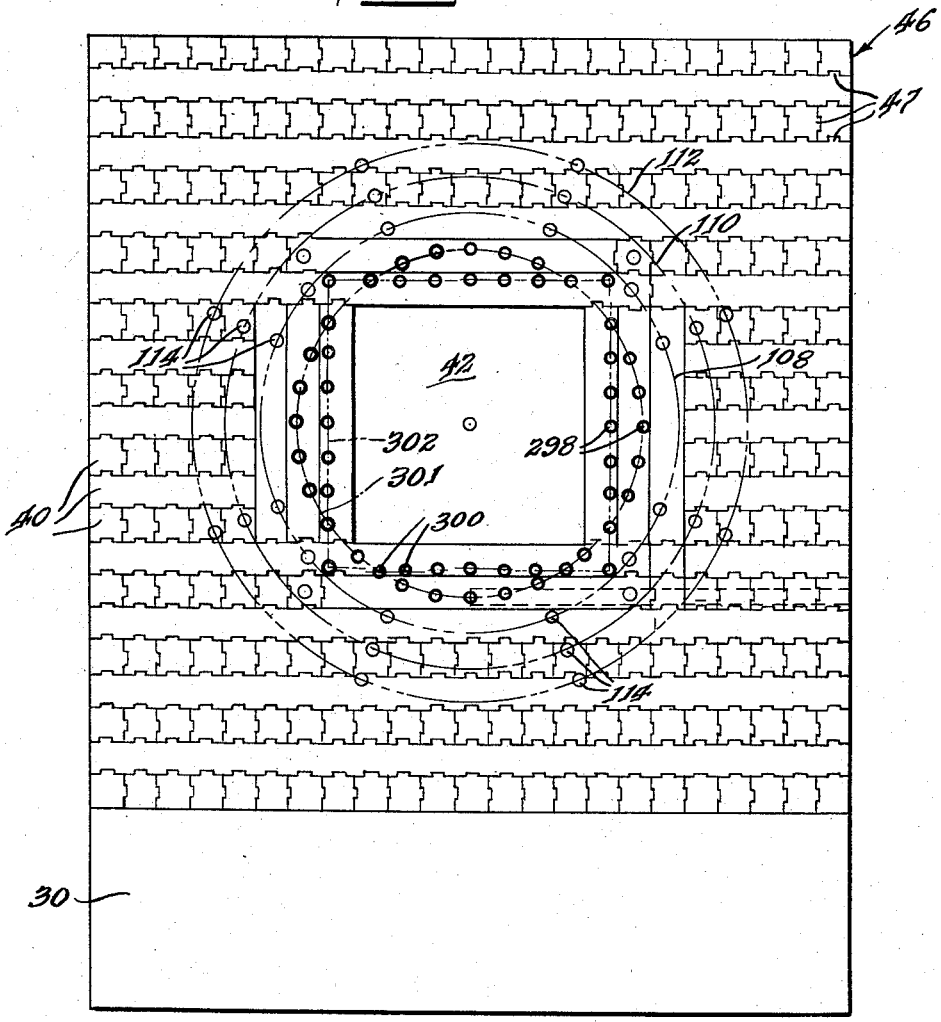
Fig. 3 is an elevation view of the operating face of the neutronic reactor, taken along the line 3—3 of Fig. 1, showing a cavity extending through said reactor.

Fig. 12 a view of the individually movable rings in a flux-leveling mechanism, as taken along the line 12—12 of Fig. 11;

Fig. 13 is a cross sectional view of a control rod used in the flux-leveling mechanism;

Fig. 14 is a transverse sectional view of the flux-leveling rod taken along the line 14—14 of Fig. 13;

Fig. 15 is a cross sectional view of a fuel assembly used in the reactor; and

Fig. 16 is a transverse sectional view of the fuel assembly taken along the line 16—16 of Fig. 15.

The reactor shown in the drawings and described hereinafter has been designed and developed to aid in the measurement of the physical parameters of graphite uranium lattices by means of critical experiments. Briefly, the reactor is a small enriched uranium graphite pile having a sizeable cavity at its center in which pieces of lattices of known and unknown physics parameters may be tested. The neutron flux strength and distribution are readily variable by virtue of the control devices provided from these purposes, providing thereby, a highly flexible test reactor.

Reactor structure

In reference to Figs. 1–4, there is disclosed a reactor 26 having a stationary portion 28 mounted on a concrete foundation 30 and a movable portion commonly designated as a movable face 32 supported on a carriage 34 which is adapted to operate on a pair of tracks 36 and 38. The reactor 26 is essentially a cube constructed of graphite blocks 40, said cube having the dimensions: 86.25" high by 86.25" wide by 90" long, with a test cavity 42 measuring 26.25" by 26.25" by 37.5" centered on its longitudinal axis. The movable face 32 is mounted on the carriage 34 to provide access to the test cavity 42. The movable face 32 and the end portion of the stationary portion designated 44 are reflectors for the central reactor portion noted at 46, each of the reflector sections measuring 86.25" by 86.25" by 26.25".

The carbon blocks 40 are machined to a cross sectional area 3¾" by 3¾", and are interlocked with each other by appropriate grooves and tongs 47, as shown in Figs. 3 and 4. The graphite blocks 40 which have extremities forming the corners of the reactor have vertical 1.5" diameter holes running therethrough fitted with 1.5" diameter graphite cylinders 48 to tie the structure together. A channel 50, termed a source hole, extends up to the center of the test cavity 42, approximately 5.6" below its lower surface. The source hole 50 is used for introducing a neutron source to insure a safe start-up of the reactor 26.

The reactor 28 has one flux-leveling mechanism associated with the movable face 32 and another one associated with the end portion 44. A flux-leveling mechanism 52 is shown in detail in Figs. 11, 13 and 14. Both of the flux-leveling mechanisms are identical in structure which will be described in detail hereinafter. The reactor 28 is equipped with two mechanical safety control systems: a horizontal system comprising control devices 54 and a vertical system comprising control devices 55 which will be described in detail hereinbelow.

Horizontal-control safety system

There are eight horizontal-control devices 54 mounted to a housing 56 located at the stationary portion 28 of the reactor 26 adjacent to the end portion 44, as shown in a curtailed manner in Fig. 1. For details as to structure of the horizontal-control devices 54, reference should be had to Figs. 5–8. Each horizontal-control device 54 has a control rod 56a adapted to be operated within a stainless-steel tube 58 horizontally disposed within the central reactor portion 46, said tube having a 1.500" O.D. and 1.384" I.D. The tube 58 is made up of nine sections 60, each section beng 4.166" long. These nine sections 60 can be simply designated as 60a, 60b, 60c, 60d, 60e, 60f, 60g, 60h, and 60i. Five of these sections, namely 60a, 60c, 60e, 60g, and 60i are undercut on the outside of the tube 58 and are wrapped with 0.02" thick cadmium foil 61, the remaining four sections, namely 60b, 60d, 60f, and 60h are unaltered. Slidably disposed within the tube 58 is the control rod 56a comprising a tube 62 constructed of aluminum having a 1.342" O.D. and a 1.278" I.D. Within the tube 62, there are four cadmium slugs 64 and four fuel slugs 66 of aluminum-U$^{235}$ alloy. The slugs 64 and 66 are each 4.166" long. Each of the slugs 64 are comprised of a 0.02" thick cadmium foil 68 on a cylindrical aluminum body 70, the assembly being clad in a 0.010 to 0.015" thick aluminum skin so that the slug has an O.D. of 1.275". The fuel slugs 66 are fabricated of solid cylinders 71, 1.235" in diameter, of aluminum-uranium alloy and clad with aluminum .020" thick, their compositions in weight per inch of slug being:

U$^{235}$ _____ 13.2 gms.
Total uranium _____ 14.2 gms. at 93% enrichment.

The control rod tube 62 terminates in a cap 72 supporting a universal joint 74 which is attached to a drive rod 76. Beginning with the unconnected end 76a of the rod 56a, the tube 62 is loaded as follows: fuel slug 66, cadmium slug 64, fuel slug 66, cadmium slug 64, etc., in alternate manner until all eight slugs are disposed therein.

Since the control rod 56a is translated within the tube 58, means are provided, such as oil-impregnated bearings 82 and 84, one attached at each end of the tube 62, to provide a practically frictionless movement between the tubes 58 and 62.

The drive rod 76 passes freely through the housing 56 and is supported within a housing 86 containing a spring 88 compressed between one end of said housing and a stop 90 fastened to the drive rod 76. The housing 86 is mounted by suitable means to the housing 56. A motor 92 transmits power to a gear box 94 which has an output shaft 95 coupled to a lead screw 96 threadedly engaging an electromagnetic device 98 through a yoke 100. The device 98 is a solenoid which has a hollow core 102 adapted to receive the free end of the drive rod 76. During normal operation, the solenoid 98 is energized and holds the free end of the drive rod 76 against the force exerted by the spring 88. The motor 92 and the gear box 94 are supported by a member 104 attached to the housing 56. A selsyn unit 106 is used to control the rate of rotational movement applied by the gear box 94 to the lead screw 96. Each of the eight horizontal-control devices 54 has its own driving means comprising the motor 92 and gear box 94 which may be individually or collectively operated by means of conventional motor control circuits which are not shown and are not a part of the presently described invention.

With the alternate arrangement of steel and cadmium sections in the tube 58 and with the alternate arrangement of cadmium and fuel slugs in the tube 62, it is possible to expose the fuel slugs 66 to fission through the steel sections 60b, 60d, 60f, and 60h or to hide them within the cadmium sections 60a, 60c, 60e, and 60g by merely moving the control rod 56a by one length of the section 60. Exposure of fuel slugs 66 to fission is termed "open" position of the horizontal-control devices 54 and is illustrated in Figs. 5 and 6. Because the fuel slugs emit approximately two neutrons for each one absorbed the control rod is effectively removed from the reactor when in this position.

In the "closed" position, the four cadmium slugs 64 in the inner tube 62 are positioned under the stainless-steel sections 60b, 60d, 60f, and 60h of the tube 58 so that the tubes 58 and 62 appear in combination to be a solid cadmium rod 37.5" long. This "closed" position is shown in Fig. 7.

In case of an emergency when the control rod 56a is in its "open" position, the circuit (not shown) to the solenoid 98 may be instantaneously de-energized by any conventional means to thereby release the drive rod 76 and have it translated into the central reactor portion 46 by the compressed spring 88. The spring loaded control rod 56a can be returned to the closed position in the reactor 26 in about ½ second thereby providing a fast acting safety mechanism.

The horizontal-control devices 54 are arranged in a substantially circular pattern around the periphery of the test cavity 42. The cylindrical axes of the control rods 56a are parallel to the longitudinal axis of the test cavity 42. Three possible locations have been provided for the control rods 56a to obtain a variation in reactivity control in the reactor. The control rods 56a may be located in holes 114 disposed on a 60, 70 or 80 centimeter radius from the longitudinal axis of the test cavity 42 as indicated by the position lines 108, 110 and 112, respectively, as shown in Fig. 3. The control rod holes 114, which are unused, are fitted with graphite plugs.

*Vertical safety control system*

The secondary or vertical safety control system for the reactor 26 is provided by four vertical control mechanisms 55, each mechanism being provided with a 24" diameter, free falling disk 120, as shown in Figs. 1, 9 and 10. Each disk 120 falls into a thimble 124 placed in slots 126 vertically cut in the central reactor section 46 of the reactor 26. The slots 126 for the thimbles 124 are arranged in pairs on either side of the test cavity 42, as shown in Fig. 1. The slots 126 extend downward from the top of the reactor 26 a distance of 63.750", and are 26.271" wide by 0.812" thick. The 26.271" dimension is parallel to the longitudinal axis of the test cavity 42. The inside center of each slot 126 is located 23.563" away from the longitudinal center line of the test cavity 42. The disk 120, when at rest in the "in" position, is vertically centered with respect to the test cavity 42 and is most effective in said position. As shown in Figs. 9 and 10, the circular disks 120 comprise a .020" thick cadmium foil 127 sandwiched between two cover sheets 128 and 130 of aluminum. The diameter of the cadmium foil 127 is 21" while the outside diameter of both aluminum covers 128 and 130 is 22". The assembled sandwich of the foil 127 between the sheets 128 and 130 is tightly banded circumferentially by a grooved, ¼" thick, steel ring 132 which is 24" in diameter. The aluminum sheets 128 and 130 are fastened to the foil 127 and to each other by means of rivets 134. The rivet holes containing the rivets 134 are countersunk in both sheets 128 and 130 and the rivet heads are sanded flush with the surrounding surfaces so that they present no obtruding surfaces to impede the descent of the disk 120 into the thimble 124.

The thimble 124 comprises a pair of walls 136 and 138 disposed parallel to each other and maintained in said position by side walls 140 and 142. The side walls 140 and 142 terminate at the lower end in a bottom piece 144. Approximately two-thirds of each thimble 124 is contained within the slot 126 in the reactor 26, one-third of said thimble extending above a top surface of the reactor 26. The thimble 124 is supported at the top of the reactor 26 by angle-iron brackets 146 and 148 which are suitably fastened to the walls 136 and 138, respectively. The brackets 146 and 148 rest on top of a ¼" thick boral shield 150 which is fastened to the top of the reactor 26. The walls 136 and 138 are fabricated of aluminum sheets ⅛" thick and the walls 140, 142 and 144 are also made of aluminum. The overall dimensions of the thimble 124 are ¾" thick by 26³⁄₁₆" wide by 87⅞" high. The thimble 124 projects into the slot 126 a distance of 61⅝" and extends 26¼" above the top of the reactor 26. An angle-iron gantry 152 is mounted on top of the reactor 26 and is positioned over the thimble 124. The function of the gantry 152 is to position and support a hoist mechanism 154. The hoist mechanism 154 comprises a mounting block 156, a drum 158, a motor 160 and an electromagnet 162 supported by a cable 164 wound about the drum 158.

The electromagnet 162 used for raising the disk 120 is of a horseshoe type as indicated by the form of the yoke 166 terminating in pole pieces 168. Each pole piece 168 is ¼" by 4" wide and is adapted to match the curvature of the disk 120. The electromagnet 162 is raised or lowered at the rate of 12" per minute by the hoist mechanism 154.

Since each disk 120 weighs approximately 17 lbs. and falls freely a distance of about 5 feet before it strikes the bottom of the thimble 124, it is necessary to provide a decelerating mechanism 170 in the lower portion of the thimble 124. The decelerating mechanism 170 comprises a headboard 172 having an arcuate cutout 174 adapted to engage with the contour of the falling disk 120, and a plurality of springs 176 fastened to the bottom of the headboard 172 and supporting said headboard a predetermined distance above the bottom 144. The headboard 172 is constructed of aluminum plate ⁷⁄₁₆" thick, 9" high and 24⅝" wide and is supported approximately 4" above the bottom 144.

*Flux-leveling control system*

The reactor has a control for adjusting the linearity of the flux distribution throughout its length in order to facilitate interpretation of results obtained in tests made in the reactor. Each of the end reflector portions 32 and 40 is drilled through its 26.250" dimension with about 250 holes 1.5" in diameter, designated 200 in Fig. 4. These holes 200 are arranged in any array symmetrically about vertical and horizontal planes through the longitudinal axis of the reactor 26. The holes 200 are spaced approximately 3.75" apart between centers and extend almost to the edges of the reactor. The flux-leveling control system comprises two flux-leveling mechanisms 52 and will be described with reference to Figs. 1, 11, 12, 13 and 14. A flux-leveling mechanism 52 including the housing 56 is located at each end of the reactor 26. The major components comprising the flux-leveling mechanism 52 are rings 202, 204 and 206 (Fig. 12), actuated by motors 208, 210 and 212 (Fig. 11), respectively, which motors are suitably mounted to the housing 56. The rings 202, 204 and 206 are adapted to move a plurality of flux-leveling control rods 214 within the holes 200 in the reflector portion 32 and 44, the rods being constructed of certain materials including fissionable material as will be described hereinafter. The innermost ring 202 is supported by three support shafts 215 extending between the reflector portion 44 and the housing 56 passing through bushings in said ring spaced 120° from one another. Lead screws 216 threadedly engage said ring through tapped openings 218 which are also spaced 120° apart. Considering the flux-leveling mechanism 52 associated with the reflector section 44, the end of each lead screw 216 terminates at and rotatably engages the outer face of the reflector section 44. The other end of each of said lead screws passes through the housing 56 and terminates in a gear 220. Each of the gears 220 engages a chain drive 222 which is driven by the motor 208 through gears 223 and 224, as shown in Figs. 1 and 11.

The middle ring 204 is similarly supported by support shafts 225 and is slidably driven along them by lead screws 226 passing through the housing 56 and terminating in the outer face of the reflector section 50. The other end of each lead screw 226 terminates in a gear 228 driven by the motor 210 through gears 229 and 230 and a chain drive 232.

The outer ring 206 is similarly supported by support shafts 233 and driven by lead screws 234 passing through the housing 56 and having one end thereof terminating in the outer face of the reflector section 44. The other end of each lead screw 234 terminates in a gear 236, said gear being driven by a chain drive 238 coupled through gears 239 and 240 to the motor 212. It is to be understood that the flux-leveling mechanisms at each end of the reactor 26 are identical in structure.

Each of the rings 202, 204 and 206 is constructed of aluminum. The ring 202 is constructed of aluminum 25" O.D. by 2¾" I.D. by ½" thick; ring 204 is similarly constructed of the same material having 46.5" O.D. by 26" I.D. by ½" thick, and is concentric with the center ring 202; the outer ring 206 is also constructed of an aluminum 72" O.D. by 47.5" I.D. by ½" thick, and is concentric with the first and second rings 202 and 204. The various lead screws described hereinabove, are supported by bushings (not shown) mounted in the housings 56. The lead screws 216, 226 and 234 have three threads per inch and are adapted to be driven so that they move their individually associated rings 202, 204 and 206, respectively, independently along the longitudinal axis of the reactor 26 through a total distance of 8" at a speed of 1" in 2½ minutes. The ring 202 has 36 available positions for attaching flux-leveling rods 214, the metal ring 204 has 82 available positions and the outside ring 206 has 108 available positions. Thus, it is evident that a large range in reactivity control can be exercised over flux generation in the reactor.

The construction of the flux-leveling rod 214 is shown in detail in Figs. 13 and 14. The flux-leveling rod 214, in its full inboard position, is disposed within a steel tube 242 extending through one of the reflector portions of the reactor 26. The flux-leveling rod 214 comprises a plurality of flux-leveling slugs 244 separated from each other by spacers 246 contained within a tube 248. The tube 248 is closed at each end by plugs 250 and 252 which engage by means of threads with said tube. A shaft 254 made of aluminum passes along the longitudinal axis of the tube 248 and has one end thereof secured to the plug 250. The other end of the shaft 254 extending outward through the plug 252 has a threaded portion thereon for engaging a nut 258 which additionally secures the shaft 254 to the flux-leveling rod 214. The flux-leveling rod 214 is secured by means of its shaft 254 to one of the rings 206, for example, by means of the nuts 260. All of the flux-leveling rods 214, associated with the other rings, are similarly attached to their respective rings. The slugs 244 are made of enriched $U^{235}$-aluminum alloy tubular sections 2" long and having an O.D. of 1.275" and an I.D. of 0.943", the composition in weight per inch being:

Total uranium content ____ 4.4 gms. at 93% enrichment
$U^{235}$ _____ 4.1 gms.

Any desired number of fuel slugs 244 and spacers 246 may be loaded into the tubes 248 and any desired number of flux-leveling rods 214 can be secured to each of the rings 202, 204 and 206 to produce an amount of neutron flux desired within the reactor. The holes within the reflector sections of the reactor 26, which are not utilized for housing the the flux-leveling rods 214, are filled with graphite plugs.

*Movable face of the reactor*

As was indicated previously, the face 32 of the reactor 26 is mounted on a carriage 34 which is movable on tracks 36 and 38. When the movable face 32 is completely open, it is separated by a distance of 6 feet from the stationary portion 28, and ample access is available for loading the test cavity 42.

The carriage 34 comprises a platform 262 set on "I" beams 264 (Figs. 1, 11 and 12). The carriage 34 is movable by means of a plurality of grooved wheels 266 which engage the specially shaped tracks 36 and 38 to prevent any side play. The drive mechanism for the carriage 34 comprises three gear reduction units 268, 270 and 272, (Fig. 1) connected together by shafts 274, 276 and 278 and to a single ½ horsepower motor 280. A high speed of 26" per minute is obtained in the combination using the motor 280 to transmit power through the reduction unit 268, clutch 282, and a miter box 284 to a pinion 286 which engages a rack 288 disposed between the rails 36 and 38. A medium speed is obtained from the combination using the motor 280 to transmit power through the shafts 274 and 276, the reduction unit 270, clutch 290, and miter box 292 to the pinion 286 and rack 288. The lowest speed is obtained from the combination using the motor 280 to drive the shafts 274, 276 and 278, reduction unit 272, clutch 294, and miter box 296 coupled through the miter box 292 to the pinion 286 and the rack 288. The clutches 282, 290 and 294 are designed to slip in case of an overload so that no damage will occur if a failure occurs in one of the reduction units associated with said clutches. The clutches described herein operate on an electromagnetic principle and can be energized selectively to obtain the different speeds desired. To prevent accidents in starting the reactor, the movable face 32 is operable at preselected speeds according to its distance from the stationary portion 28. The position of the movable face 32 determines the selection of the proper gear reduction unit by causing the associated clutch to operate. The mechanism is so set that during the first 4 feet of its motion, i.e., from full open position to a 2 foot open position, the carriage 34 travels at the rate of 26 inches per minute. From the 2 foot open position to a 3-inch open position, the rate of travel is 6 inches per minute, and over the last 3 inches of travel, the rate of speed is ½ inch per minute.

*Core fuel loading*

The test cavity 42 is surrounded by steel tubes 298 contained within the openings 300 which run the length of the test cavity parallel to its longitudinal axis, as seen in Fig. 3. Two types of fuel load arrangements are possible; one of these being an essentially cylindrical distribution as indicated by a position line 301, and the other being a square arrangement as indicated by the position line 302, as shown in Fig. 3, each of the distributions providing 32 steel tubes 298. The openings 114 which are not used in a particular fuel arrangement are plugged with graphite cylinders. The tubes 298 are adapted to receive a fuel assembly as will be presently described, said assembly being commonly designated as a driver rod 304.

Each driver rod 304 comprises an aluminum container 306 having a removable cap 307 threadedly attached to one end and housing therein a plurality of hollow fuel slugs 308 of fissionable material as illustrated in Figs. 15 and 16. Each of the hollow fuel slugs 308 comprises a foil 310 of about 93% enriched $U^{235}$ suspended in lead lining the inside surface of an aluminum tube 312. Each of the slugs 308 is 2" long and has an outside diameter of 1.275", the tube 312 having a wall thickness of .020". The lead-uranium foil 310 contains 0.164 grams of $U^{235}$ per cm. of foil surface area, the $U^{235}$ to lead weight ratio not to be less than 20%. The wall thickness of the foil 310 is approximately .040" but will vary according to the particular oxide employed in order to maintain the weight per area ratio stated above. The compositions in weight per inch of the fuel slugs 308 are:

$U^{235}$ content_____ 4.1 grams.
Total uranium content_____ 4.4 grams at 93% $U^{235}$ enrichment.
Lead content_____ 20.3 grams maximum.

Aluminum spacers 314 having a 1.275" O.D. are located between the fuel slugs 308, their lengths varying according to the critical loading desired. The spacers 314 have an I.D. of .943", which is somewhat smaller than that of the fuel slugs 308 so that if the fuel slugs are caused to melt, the liquid metal will be contained between the spacers on either side thereof.

*Critical mass of the reactor*

To describe a critical loading for the disclosed reactor consideration must be given to the total fissionable fuel contained in the driver rods 304 surrounding the test cavity 42 and in the flux-leveling rods 214 in the reflector portions 32 and 44. The driver rods 304 are arranged in the cylindrical array designated by position line 301. The flux-leveling rods 214 are distributed uniformly in planes forming circles of 70 cm. radius at either end of the cylinder formed by the driver rods and at a position about 4 inches from the ends of the test cavity 42. When the test cavity 42 is loaded with a graphite lattice core 316 (Fig. 2) the reactor will sustain a nuclear chain reaction with a total of 5.5 kg. of $U^{235}$ in the driver rods 304 and a total of 4.1 kg. of $U^{235}$ in the flux-leveling rods 214. Although the horizontal-control rods 56a contain $U^{235}$, they act as a poison to the reaction even in their "open" position because of neutron absorption in the cadmium and steel parts therein. The aluminum thimbles 124 for the vertical safety devices also act as poisons in the reactor. It has been found that if the control rods and the thimbles were excluded from the reactor, the critical mass would be 7.33 kg. assuming the above-described fuel configuration.

Fuel melt

If both of the mechanical safety systems, i.e., the 8 control rods 56a and 4 safety disks 120 should fail to function in response to excess reactivity generated in the reactor 26, the power level of the reactor would continue to rise until some change in its geometrical configuration would cause it to lose reactivity. Assuming intimate thermal contact between the uranium oxide and the lead in the fuel elements 308, when the power level reaches about $2 \times 10^6$ watt-seconds, the lead in the hollow lead-uranium-oxide mixture fuel slugs 308 will melt, the liquid metal flowing to the bottoms of the tubes 306. The tubes 306 being fabricated of aluminum will maintain their shape after melting of the fuel slugs. In this geometry, i.e., the collapsed condition, the self-shielding of the uranium is greater than it is in the hollow slug configuration and therefore the reactor will lose considerable reactivity when the fuel melts. An experiment has been conducted and it has been found that for the particular mixture used in this reactor, a reactivity loss of greater than 6% will occur when the fuel in the driver rods 304 melts, which will adequately cause the reaction to discontinue without further damage to the reactor.

It is the intent of the inventor that his invention should not be limited to the specific embodiment hereinbefore described but should be extended to include all modifications within the scope of the appended claims.

What is claimed is:

1. A fuel slug for a neutronic reactor comprising an aluminum tube and a foil lining the inside surface of the tube said foil being fabricated of highly enriched uranium in a lead matrix.

2. A fuel rod for a neutronic reactor, comprising an aluminum cylindrical container having a cap removably attached at one end; a plurality of fuel slugs disposed within the container, each of said slugs comprising an aluminum tube and a foil lining the inside surface of the tube said foil fabricated of approximately 20% $UO_2$ and 80% lead; and aluminum rings spacing the fuel slugs within the container, each of said rings having an outer diameter equal to that of the fuel slugs and an inner diameter substantially less than that of said fuel slugs.

3. In a thermal neutron fissionable reactor having a solid moderator with horizonal apertures described therethrough for receiving fuel rods and one or more safety devices operable responsive to a power excursion of the reactor to shut said reactor down, the improvement therein, wherein each of said fuel rods comprises an aluminum container, said container housing a plurality of fuel slugs, each of said slugs comprising an aluminum tube and a foil lining the inside of said tube, said foil being fabricated of $UO_2$ in a matrix of lead, spacer rings disposed between said fuel slugs, each of said rings having an outer diameter approximately equal to that of the fuel slugs and an inner diameter substantially smaller than that of said fuel slugs, whereby in the event said safety devices fail to operate responsive to a power excursion of the reactor the fuel slugs will melt, their change in shape causing a reduced activity sufficient to shut down the reactor.

References Cited in the file of this patent

UNITED STATES PATENTS 2,851,409     Moore _____ Sept. 9, 1958

OTHER REFERENCES

"Science and Engineering of Nuclear Power," edited by Goodman, 1948, vol. 1, page 303.

"Nuclear Power," Aug. 1957, pp. 329–330.